United States Patent
Trauberg (10) Patent No.: US 9,412,122 B2
(45) Date of Patent: Aug. 9, 2016

(54) METHOD OF SELECTING AND PURCHASING DIGITAL OBJECTS FOR SUBSEQUENT DELIVERY TO A THIRD PARTY

(75) Inventor: Markus Trauberg, Velchede (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 988 days.

(21) Appl. No.: 10/513,268

(22) PCT Filed: Feb. 21, 2003

(86) PCT No.: PCT/EP03/50028
§ 371 (c)(1),
(2), (4) Date: Nov. 1, 2004

(87) PCT Pub. No.: WO03/094481
PCT Pub. Date: Nov. 13, 2003

(65) Prior Publication Data
US 2005/0216377 A1    Sep. 29, 2005

(30) Foreign Application Priority Data
Apr. 30, 2002  (DE) ................................ 102 19 391

(51) Int. Cl.
*G06Q 30/06* (2012.01)
*H04L 29/06* (2006.01)
(Continued)

(52) U.S. Cl.
CPC ............. *G06Q 30/06* (2013.01); *G06Q 40/12* (2013.12); *H04L 29/06* (2013.01); *H04L 67/04* (2013.01); *H04L 67/20* (2013.01); *H04L 69/329* (2013.01)

(58) Field of Classification Search
USPC ............ 709/217–219, 223, 227–229; 705/26; 707/9–10
See application file for complete search history.

(56) References Cited

U.S. PATENT DOCUMENTS 4,953,209 A * 8/1990 Ryder et al. .................... 705/59
5,555,496 A * 9/1996 Tackbary et al. ............... 705/27
(Continued)

FOREIGN PATENT DOCUMENTS

| DE | 19750361 A1 | 5/1999 | ........... G08G 1/0968 |
| DE | 19956023 A1 | 4/2001 | ............. H04L 12/28 |

(Continued)

OTHER PUBLICATIONS

Hartung et al. "Digital Rights Management and Watermarking of Multimedia Content for M-Commerce Applications", IEEE Communications Magazine, IEEE Service Center, vol. 38, No. 11, Nov. 2000, pp. 78-84.

(Continued)

*Primary Examiner* — Bunjob Jaroenchonwanit
(74) *Attorney, Agent, or Firm* — Slayden Grubert Beard PLLC (57) ABSTRACT

Disclosed is a method for transferring user data objects, wherein a data providing component provides user data objects. According to the method, the data providing components are called up by a first telecommunication device in order to transfer a selection of certain user data objects to a second telecommunication device. The data providing component transmits a transfer offer message to the second telecommunication device in order to inform the latter on the user data objects that are to be transferred. At least one useful data object is then selected in a second telecommunication device, whereupon the user data object is transferred from the data providing component to the second telecommunication device. The user data object which is transferred to the second telecommunication device is then charged to the first telecommunication device.

18 Claims, 1 Drawing Sheet

---

Download service message type: Gift request
Version: 1.0
Sender address: User@DownloadserviceA
Recipient address: +49-170-12345678
Date: 20.3.2002, 14:15:00 GMT+1:00
Delivery date: 21.3.2002, 10:00:00 GMT+1:00
Validity date: 31.3.2002, 23:59:59 GTM+2:00
User rights: Play five times
Maximum price: EUR 2.00
Message text: Hello User B, Happy Birthday! As a small token you can download the current song from artist X – really gross! Greetings and have a good day, User A.
Message status: Yes
Delivery status: Yes (51) Int. Cl.
*H04L 29/08* (2006.01)
*G06Q 40/00* (2012.01)

(56) References Cited

U.S. PATENT DOCUMENTS

| | | | |
|---|---|---|---|
| 5,809,144 A * | 9/1998 | Sirbu et al. | 705/53 |
| 6,047,265 A * | 4/2000 | Sugimori | 705/26 |
| 6,175,823 B1 * | 1/2001 | Van Dusen | 705/26 |
| 6,223,291 B1 * | 4/2001 | Puhl et al. | 726/28 |
| 6,321,211 B1 * | 11/2001 | Dodd | 705/26 |
| 6,633,849 B1 * | 10/2003 | Dodd | 705/1 |
| 7,006,989 B2 * | 2/2006 | Bezos et al. | 705/26 |
| 7,206,765 B2 * | 4/2007 | Gilliam et al. | 705/51 |
| 2001/0052077 A1 * | 12/2001 | Fung et al. | 713/184 |
| 2002/0023009 A1 * | 2/2002 | Ikeda | 705/26 |
| 2002/0026377 A1 * | 2/2002 | Takahashi | 705/26 |
| 2004/0139318 A1 * | 7/2004 | Fiala et al. | 713/165 |
| 2005/0004875 A1 * | 1/2005 | Kontio et al. | 705/52 |
| 2007/0240156 A1 * | 10/2007 | Nakata | 717/178 |

FOREIGN PATENT DOCUMENTS

| | | | | |
|---|---|---|---|---|
| JP | 2001265945 A * | 9/2001 | | G06F 17/60 |
| WO | 0044119 A | 7/2000 | | H04K 1/00 |
| WO | WO 00/44119 | 7/2000 | | |
| WO | WO 0116786 A1 * | 3/2001 | | G06F 17/00 |

OTHER PUBLICATIONS

XP 000969744, "Digital Rights Management and Watermarking of Multimedia Content for M-Commerce Application", IEEE Communications Magazine, 7 pages, Nov. 2000.

* cited by examiner

Download service message type: Gift request
Version: 1.0
Sender address: User@DownloadserviceA
Recipient address: +49-170-12345678
Date: 20.3.2002, 14:15:00 GMT+1:00
Delivery date: 21.3.2002, 10:00:00 GMT+1:00
Validity date: 31.3.2002, 23:59:59 GTM+2:00
User rights: Play five times
Maximum price: EUR 2.00
Message text: Hello User B, Happy Birthday! As a small token you can download the current song from artist X – really gross! Greetings and have a good day, User A.
Message status: Yes
Delivery status: Yes

METHOD OF SELECTING AND PURCHASING DIGITAL OBJECTS FOR SUBSEQUENT DELIVERY TO A THIRD PARTY

BACKGROUND OF THE INVENTION

The present invention relates to a method for transferring user data objects that when called up by a first telecommunication device are transferred from one data providing component to a second telecommunication device. In particular, the present invention relates to a method whereby a user of the first telecommunication device transfers or grants chargeable user data objects from the data providing component to the second telecommunication device.

At present, a method or service for the reliable and chargeable downloading of user data objects to a telecommunication device, particularly in the form of a mobile radio device, in a data communication network, is under discussion. In this case, the downloading of user data objects to the mobile radio device takes place via a protocol specified by the WAP-Forum (WAP: Wireless Application Protocol) or an Internet protocol (e.g., Hypertext Transfer Protocol: http). The service for downloading is specified in such a way that a user, with the aid of an application program available on the mobile device, the program being designated as a download client, is enabled to download any user data objects offered by one or more data providing components, particularly servers or download servers of service providers, in the data communication network. One possible version of the service proposes placing restrictions or limitations with regard to utilization by the user of the mobile radio device on a user data object that can be downloaded. Thus, for example, the number of times, or the duration for which, the user data object can be used may be restricted. The practical implementation is achieved by describing the restrictions with an appropriate language, such as the ODRL (Open Digital Right Expression Language), whereby the download client or any other special application for administering the rights linked with a user data object, receives the rights description, evaluates same, stores it in a protected part of the memory on the mobile radio device not accessible to the user and when a user requests use of the object either grants or does not grant the rights according to the description of the rights. The user data object itself can be protected from unauthorized access either in that it is stored encrypted in a freely accessible area of the memory on the mobile radio device or is administered by a special application that does not permit unauthorized access to the object by the user.

With a method of this kind for downloading user data objects from a data providing component in a data communication network there is, however, the disadvantage that a user data object cannot be transferred to a different user for utilization, particularly if forwarding of the rights description is not permitted. Therefore, for example, the gifting of a chargeable user data object and the associated user rights from a first user to a further user of the service is not possible.

U.S. 2002/026377 A1 describes a method for sending a gift via a server operating as a gift center on the Internet to a recipient. According to a preferred embodiment therein, a sender who wants to send the gift to the recipient registers as a member of the server, chooses a selection of possible gifts, downloads product pictures of the selection of possible gifts from the server and then itself sends an e-mail to the recipient, with the product pictures being thereto. On receipt of the e-mail from the sender, the recipient can then select one of the possible gifts and specify the method of delivery to him/her.

In accordance with a further embodiment, the sender registers via the Internet with the server, chooses a certain gift or a selection of possible gifts and provides a recipient address or e-mail address of the recipient. The server then sends an e-mail to the stated recipient and arranges for the recipient to access the homepage of the server in order to view the picture of the possible gift(s).

WO 00 441119 A describes a method for downloading or transferring contents from a server via a network to a telecommunication device. In particular, this describes the transfer of contents that are, or can be, paid for by means of the management of digital rights (Digital Rights Management).

The present invention seeks to provide a facility via which a first user of a telecommunication device can allow a user data object, to be transferred to a second user of a telecommunication device.

SUMMARY OF THE INVENTION

A method is herein provided for transferring user data objects, particularly via a telecommunication network, whereby a data providing component is provided that allocates user data. With this method, a transfer request message is first transmitted from a first telecommunication device to the data providing component, to instruct same to transfer a selection of a group of user data objects to a second telecommunication device. It should be noted that the group can consist of one or more user data objects. The user data objects can be data in the form of text data, picture or video data, audio data, executable programs or software components or a combination of these types of data; i.e., of multimedia data or content. After receipt of the transfer request message, the data providing component sends a transfer offer message to the second telecommunication device, with the transfer offer message having a (first) item of description information for the first group of user data objects. Then, via the second telecommunication device, at least one user data object that is to be transferred to the second telecommunication device is selected from the group of user data objects. This minimum of one selected user data object is then transferred from the data providing component to the second telecommunication device.

It also should be noted that the group of user data objects can, for example, consist of logically related data objects. The relationship in this case can exist, for example, in audio data such as MP3 files of a specific artist or a specific musical trend. It is also conceivable that image files with a similar thematic content can be provided in a group of user data objects. It is further possible that user data objects with the same content but with different versions, quality or detail content are provided in a group of user data objects.

In accordance with an embodiment, after a successful transfer of at least one selected user data object to the second telecommunication device, the first telecommunication device or the user of same is billed by the second telecommunication device. As part of this, the data providing component can, after it has received a message from the second telecommunication device concerning a successful transfer or delivery of the user data object, have a suitable billing message sent to a billing system that is assigned to the first telecommunication device or to a telecommunication network connected to same. Thus, it is possible that the user of the first telecommunication device is charged for the user data object transferred to the second communication device and, for example, together with regular charges to be paid, pays for his/her participation in a communication network (e.g., monthly standing charge for the connection) or for (monthly)

call charges to other communication users or other telecommunication devices. In sum, the user of the first telecommunication device is provided with a method whereby he/she can transfer or gift a certain user data object that is chargeable and may be provided with certain user rights, in a simple manner to a second telecommunication user with a second telecommunication device.

In accordance with another embodiment, the data providing component can, before the step of sending the transfer offer message, determine processing information that indicates the type of user data objects the second telecommunication device is set up to process. In this case, the term "set up" refers to, on the one hand, the second telecommunication device being designed only for processing certain user data objects, or has only certain technical capabilities (either software or hardware) or, on the other hand, the user of the second telecommunication device having set it up or released it only for processing certain user data objects. As such, by obtaining processing information it is possible for the transfer offer message to be sent without it containing any description information on the user data objects that could not, or should not, be processed in the second telecommunication device. The processing information, therefore can be directly obtained by the second telecommunication device and it can, further, be fetched by a request to the first telecommunication device or the first user or it can be fetched or requested from a component assigned to the second telecommunication device, in a telecommunication network assigned to the second telecommunication device. In a case where the second telecommunication device is designed as a mobile radio device and thus can exchange data between the second telecommunication device and a stationary part of a telecommunication network via a WAP (Wireless Application Protocol), the request for processing information can be directed to a WAP Push Proxy Gateway as the component, in the telecommunication network, assigned to the second telecommunication device, that is responsible for the delivery of "push" messages and can also buffer-store the properties of the telecommunication devices connected thereto. After determining the processing information of the second telecommunication device, it is possible for the data providing component to adapt the (first) description information of the transfer offer message and/or the at least one selected user data object to be transferred to the second telecommunication device, to the processing information or to select a suitable user data object.

In accordance with another embodiment, it is possible for a (second) description information on all or certain user data objects, particularly a certain group of user data objects, to be transferred to the first telecommunication device before the transfer of the transfer request message from the data providing component. Using this (second) description information, the user of the first telecommunication device is then in a position to select which user data object(s) he/she wishes to transfer or gift to the second telecommunication device. Because it may be possible that not all the user data objects that are provided by the data providing component can be transferred or gifted to a second telecommunication user or a second telecommunication device on request, it is advantageous if the (second) description information contains a notice that a selection, particularly of a certain group of user data objects, can be transferred or gifted to a further telecommunication device or a further telecommunication user. The selection in this case can be a user data object, several user data objects or all user data objects, particularly of the group.

So that the first telecommunication device is informed of the progress of the transfer process (gifting process) of user data objects to the second telecommunication device, it is possible in accordance with a further embodiment that, after the transfer request message step and/or after the step of sending the transfer offer message (from the data providing component to the second telecommunication device) and/or after the step of transferring at least one selected user data object (from the data providing component to the second telecommunication device), for a particular status report or confirmation report to be sent from the data providing component to the first telecommunication device. Thus, the user of the first telecommunication device receives confirmation of the essential steps of his/her transfer or gifting process initiated by him/her and can see how far the process has progressed.

In accordance with another embodiment, the transfer request message can incorporate a binary coding, a text presentation based on XML (Extended Markup Language), a binary XML-based presentation or a text presentation via header fields. Advantageously, the transfer request message in this case contains information on the type of message (i.e., that it is a request message for gifting a user data object), information on the choice of user data objects to be transferred to the second telecommunication device and a recipient address that is assigned to the second telecommunication device. This recipient address, or in the case of a gifting process also known as the gift recipient address, can be present in this case as a telephone number (MSISDN: Mobile Subscriber ISDN, =subscriber telephone number, under which a mobile radio user can be reached), an IP (Internet Protocol) address, as an e-mail address, etc. Furthermore, it is also possible for the transfer request message to contain information on the sender address (i.e., the address of the first telecommunication device, particularly in the function of gifting), and information on the sending date and/or the sending time of the transfer request message or gift request, on the required delivery date and/or the required delivery time of the transfer offer message (of the gift offer), and on the date and/or time up to which the transfer offer message(s) (the gift offer) is to be valid. Furthermore, the transfer request message can contain information on the user rights linked to the user data objects to be transferred or gifted. These user rights can, in this case, show the date or time by which a user data object may be used by the user of the second telecommunication device (the recipient), how often the user data object may be used (for example, how often a song contained in an MP3 (MP3: Moving Picture Experts Group Layer-3 Audio) file may be played, etc. Furthermore, the transfer request message can also contain information on a maximum price or maximum fee for a certain user data object which the first telecommunication user is ready to pay. In this case, it is to be taken into account that the price for a certain user data object, that in a succeeding step is actually transferred from the data providing component to the second telecommunication device, can deviate with regard to price or fee if the user data object has been adapted to the processing properties corresponding to the aforementioned processing information. If the second telecommunication device is, for example, not able to display color pictures, the data providing component of the second telecommunication device will only transmit a gray tone picture, which is less expensive than a color picture. The specification of a maximum price or a maximum fee also may be useful if the user of the first telecommunication device or the first telecommunication user decides to offer the user of the second telecommunication device or the second telecommunication user a transfer offer, particularly a gift offer, in that the second telecommunication user may select several from a group of user data objects; for example, as a gift. In this case, the group of user data objects can, for example, contain MP3 files with songs by a certain artist, whereby the second telecommunication user can make a selection of songs up to a certain price. To explain or comment on the transfer offer message to be transmitted later to the second telecommunication device or the second telecommunication user, the transfer request message can also contain a comments field. This comments field can contain either pure text elements or also multimedia elements. Furthermore, the transfer request message can contain information or details regarding whether the first telecommunication user wants a status report (for example, for the delivery of the transfer offer message to the second telecommunication device and/or on the delivery of the selected user data object to the second telecommunication device) and any associated (financial) billing by the data providing component.

Corresponding to the information contained in the transfer request message, the transfer offer message can contain information on the initiator or sender of the transfer process (i.e., the sender address, particularly the gift sender address). In this case, in addition to the actual address in the form of an IP (Internet Protocol) address, a telephone number, or an e-mail address, a complete collection of contact information of the initiating or gifting (first) telecommunication user also can be contained in the form of an electronic visiting card (VCard). Furthermore, information on the send date and send time of the gift request, the date or time up to which the gift offer(s) is to be valid, with the user rights linked to the user data objects to be transferred to the second telecommunication device or an optional comment from the first telecommunication user directed to the second telecommunication user can be contained. In addition to these general details of the transfer offer message, this can also contain, as already mentioned, description information for describing the user data objects contained in the offer. Particularly if the offer, or the offer message, includes several user data objects that are to be transferred to the second telecommunication device, the description information for each user data object can contain a separate element that describes this. Advantageously, the elements of the description information can be similarly structured so that the information on the different user data objects can be easily compared. For a transfer of user data objects whereby the second telecommunication device cannot make a choice but the transfer offer instead refers to a number of user data objects specified by the first telecommunication device, a uniform description information can be used for all the user data objects to be transferred.

In accordance with an advantageous embodiment, the transfer offer message can be transmitted as part of a message in the Short Message Service (SMS), a message in the Multimedia Messaging Service (MMS), an e-mail or an instant message in Instant Message Service (IMS). If the second telecommunication device has a radio module or mobile radio module designed to support WAP, the transfer offer message can also be transmitted via a "push" message (for example, by WAP-push) to the second telecommunication device. As already mentioned, the transfer of the user data objects should take place via a telecommunication network. In this case, it is possible that the first and second telecommunication devices are each part of a communication network, whereby both communication devices need not be part of the same telecommunication network. Accordingly, the data providing component, that particularly is in the form of a data server of a service provider, can be provided in a telecommunication network that is connected to the telecommunication network(s) assigned to the first and second telecommunication device.

To be able to use the method of transferring user data objects as flexibly as possible, the first and/or the second telecommunication device can be designed as a mobile telecommunication device and particularly include a radio module or mobile radio module. The telecommunication devices in this case can, for example, be in the form of a mobile telephone, a cordless telephone, a smartphone (combination of a small portable computer and a mobile telephone), a PDA (Personal Digital Assistant) or an organizer. Furthermore, the telecommunication devices can also include other mobile accessible devices, such as a personal computer (PC) or a laptop that can be reached via a connected mobile radio device (mobile telephone) via a mobile radio network. The mobile radio device can, for example, be connected by a cable to the personal computer or the laptop or can have a wireless contact with these via an infrared interface or a local Bluetooth network. In this case, the first and/or second telecommunication device, including that of the telecommunication network assigned to it, can operate as a type of mobile radio network in accordance with the GSM (Global System for Mobile Communication) standard or the UMTS (Universal Mobile Telecommunications System) standard. Mobile radio networks of this kind or telecommunication devices in accordance with the GSM or UMTS standards can be a platform for WAP (Wireless Application Protocol) or the WAP protocol stack, via which data (messages or user data objects) can be transmitted in the particular mobile radio network. Where the WAP protocol stack is used, it is possible by using a WAP gateway as an interface between a mobile radio network and a different network (for example, a network based on an Internet protocol), to establish a connection thereto. In this way, it is possible for the data providing component to be located in a network based on an Internet protocol, such as the Internet, whereby the data (messages, user data objects) can be transmitted via a WAP gateway and finally via an air interface of a mobile radio network between the base station(s) of the mobile radio network and a particular telecommunication device.

Additional features and advantages of the present invention are described in, and will be apparent from, the following Detailed Description of the Invention and the Figures.

DETAILED DESCRIPTION OF THE INVENTION

Figure 1:
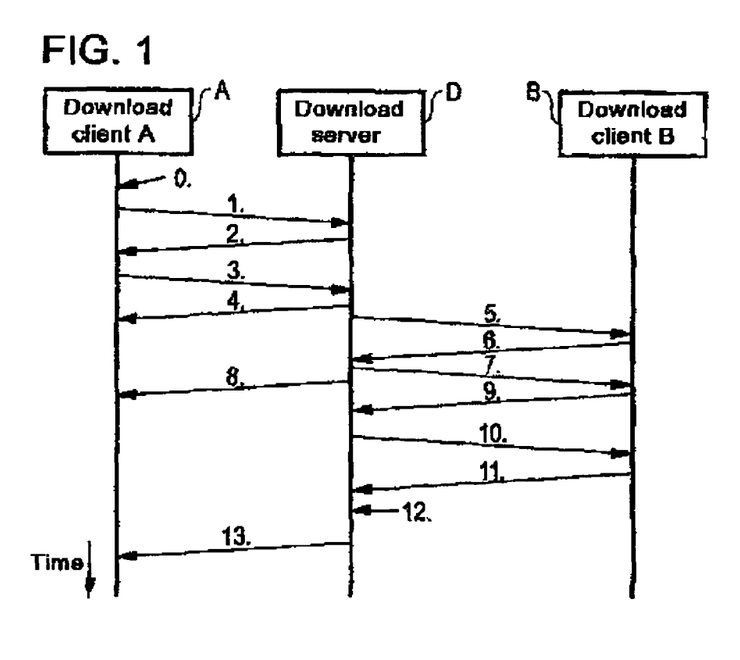
FIG. 1 shows a block diagram of the components involved in a method for transferring or gifting user data objects, including the data flow between the components.

As can be seen in FIG. 1, a telecommunication arrangement for performing a method for the transfer or gifting of user data objects consists of a data providing component D for providing user data objects, as well as a first telecommunication device A and a second telecommunication device B. Both telecommunication devices in the example are in the form of mobile radio telephones that operate on the GSM or UMTS standards. Let us further assume that mobile telephone A is part of a first mobile radio network, whereas mobile telephone B is part of a second mobile radio network. Mobile telephones A and B are able to use WAP protocols (e.g., Wireless Session Protocol: WSP, etc.) or to use the WAP protocol stack in order to transmit data via an air interface to a corresponding stationary transmitting/receiving arrangement of the mobile radio network assigned to the particular mobile telephones A and B. The data providing component D can be provided in a mobile radio network assigned to mobile telephone A or B and can, for example, be provided in the Internet that is connected by appropriate WAP gateways to the mobile radio networks of mobile telephones A and B.

As can be seen by the components shown in FIG. 1, two logic units (i.e., a "download server" and a "download client"), are required for a method for transferring or gifting.

1.) The download server, preferably embodied as a software program on a data providing component or data server, has the task of providing description information regarding a certain object managed by the download server to the download client on a telecommunication device or mobile telephone. Description information of this kind is also known as meta data or as object description. Based on a request by a user of a download client, the download server makes available to the download client a required user data object or a selection of user data objects. In doing so, the download server can take account beforehand of optionally transmitted properties of the download client or of the telecommunication device on which this is implemented, or of a device connected to the telecommunication device, in that a user data object matched to the properties is selected by the download server or specially generated for the download client, which serves as the actual recipient.

2.) The download client in particular represents a software application on a telecommunication device such as the mobile telephones A and B, or an application on a data processing device connected to the telecommunication device, such as, for example, a portable computer or a PDA. The download client first negotiates the delivery of a required user data object with the download server, receives the user data object and confirms to the download server the faultless reception thereof and, if applicable, the serviceability of the received content on the telecommunication device or on mobile telephone A or B, as used in the example. Although the version of the method in accordance with the present invention shown in FIG. 1 shows two different download clients which perform different steps of the method, both download clients also should, without limitation to the general features, have the same capabilities and functions so that, for example, the method can be reversed and download client B would be in the position to transfer or gift user data objects to download client A.

A sequence representing the method for transferring or gifting user data objects to download client B, as shown in FIG. 1, is now given in the following, with the timing of the data flow and process sequence being marked by the numbers 0. to 13. at the arrows in FIG. 1.

0.) In this preparatory step, a discovery application on mobile telephone A that, for example, can be an internet browser or a client software application for an information service (E-Mail, Short Message Service, Multimedia Messaging Service, Instant Messaging and Presence Service), can contain a reference to description information (also known as IOB (Contents Object Description) from a network such as the Internet. The reference could have been inserted in a message (e-mail, SMS message, MMS message, etc.) by a service in the network, formed by the networks assigned to components A, B and D, such as a push service, or by a different user of different telecommunication device. The reference to the description information is indicated to user of mobile telephone A with any additional information via the prepared user data object (also known as the IO (Contents Object). The user of mobile telephone A selects the reference and requests corresponding description information. The discovery application provided in mobile telephone A detects from a characteristic feature of the reference (this can, for example, be a defined expansion of the file name or a defined feature of the reference), that it is a reference to description information. The discovery application activates the download client, also provided in mobile telephone A, and passes on the reference to the client.

1.) Download client A now requests the description information from download server D. The request by download client A can also convey information on the capability of mobile telephone A or regarding wishes of the user of mobile telephone A. This, for example, includes content types or formats supported by mobile telephone A, as well as the wishes of the user with regard to the display or pricing arrangement for the user data object to be downloaded.

2.) The description information is now sent from download server D to download client A. The description information can have the following features:

A version number for specification of the description information,

The name of the user data object(s) described by the description information,

The size (i.e., data volume) of the user data object(s),

A description of the user data object(s),

The type and format of the user data object(s) (for example still image, JPEG coding), The version number of the format of the user data object(s) used, The version number of the data providing component used, The name of the provider of the user data object(s), The price and currency of the user data object(s), A reference to downloading the user data object(s), Details of the rights of use of the user data object attached to a user data object (for example, limited number of uses, preview only, demo version, etc.), Method used for encrypting the user data object(s), A version number of the method used for encrypting the user data object(s), A reference to a source for downloading suitable software for decrypting the user data object(s), A reference to a source for downloading suitable software for decoding/issue/display of the user object(s), A digital signature of the description information that enables a telecommunication device (a mobile telephone) to check the authenticity of the description information, A reference to a source for downloading suitable software for verifying a signature of the user data object(s), A reference to a source for downloading suitable software for verifying a signature of the description information, A reference to a source for downloading a suitable key for verifying a signature of the user data object(s), A reference to a source for downloading the suitable key for verifying a signature of the description information, An address to which a status report should be sent after successful downloading, An address to which a status report should be sent in the event of a failed download, An address from which in the event of an error further information can be downloaded, An identity (telephone number of address) of the provider assigned to the data providing component (for customer service), Information regarding what is to be done after successful loading or downloading of the user data object(s) (automatic installation/execution/display of the user data object(s), automatic display of information from a certain source on the Internet, and automatic display of messages/descriptions/operating instructions also supplied for downloading the user data object), A reference to a different supplier for downloading user data objects that is recommended in accordance with certain criteria and details of these criteria (for example, in a mobile radio system a server of the provider in whose network the user is booked in with his/her mobile telephone (A) or also a provider who can provide further services with the same content or the same content in a different form), A reference to other alternative description information, preferably related with regard to the topic, on user data objects or user data object groups.

In addition to this information in the description information for a specific user data object or specific group of user data objects, information in the description information that the described user data object also can be gifted is important for the following method of gifting a user data object. This information can be coded either by a special marking or by an additional reference in the description information. In the first case, this refers to the download server D being able to receive, and correctly process, a gift request or transfer request message in accordance with the following process steps, whereas in the second case the gift request or transfer request message must be sent to a different address than a request for downloading. In the latter case, in addition to the address, an identification of the gifted content also can be transferred. The illustrated second case can mean that the transfer request message from the download server D is to be processed only under the additionally referenced address, or that a different download server, that also can be assigned to a different data providing component, can be provided for processing the transfer request message. In a case of this kind, the two data providing components assigned to the corresponding download servers can be regarded as a data providing arrangement consisting of several data providing components, whereby the data providing arrangement again undertakes the function of a "large" data providing component.

3.) The user of mobile telephone A decides to offer one, or a group, of user data objects described in the description information to a user of mobile telephone B as a gift. To do this, the user of mobile telephone A asks his/her download client A to send a transfer request message to download server D. This message can contain the following information.

Information on the type of message (i.e., that it is a transfer request message or a gift request),
Optionally, an identification or a name of the user data object to be gifted (see below),
A sender address,
A gift recipient address,
The send date and time of the gift request,
A required delivery date and time for the transfer request message,
The date and time up to which the transfer request message(s) is to be valid,
User rights linked to the gift,
The maximum price for the user data object to be gifted that the user of the mobile telephone A is ready to pay,
An optional message from user A of mobile telephone A that should be shown to user B of mobile telephone B together with the description of the object to be gifted or of the object itself (this message can also contain multimedia elements),
An indication of whether the user of mobile telephone A requires a status report a) for the delivery of a transfer offer message, including the description information for the user data object to be transferred to the download client B and/or b) for the delivery of the selected user data object to download client B and the associated financial billing by the download server D.

4.) The download server D notifies download client A of the status of the transfer request message. In this way, the request of the download client A can be either accepted or rejected, or any technical problems that occur can be reported.

5.) As an option, download server D requests from download client B the capabilities or set preferences of same. The purpose of this is to match the user data object to be transferred to download client B as necessary to the capabilities of download client B, of the receiving mobile telephone B and/or the preferences of the user of mobile telephone B. Where the services for gifting user data objects are based on WAP, this request also can be directed to a WAP-Push-Proxy-Gateway responsible for delivery of push messages and can temporarily store the properties of the telecommunication devices, such as those of mobile telephone B.

6.) Download client B answers the request and in doing so indicates either the capabilities of download client B, of mobile telephone B and/or the preferences of the user of mobile telephone B, either explicitly or in the form of references to corresponding information that, for example, is stored in a database of a network component, such as the WAP-Push-Proxy-Gateway.

7.) Download server D transmits a transfer request message including description information or an object description of the user data to be transferred to download client B. A transfer of this kind can take place in "push" mode (for example, using WAP-Push), or can take place in the form of a message such as a message using the short message service, as a message in the multimedia messaging service, as an e-mail or as an instant message. The description information for the user data object to be received as a gift can have corresponding information already mentioned above with regard to description information, that has been transmitted to the mobile telephone A for a specific user data object or a group of user data objects. The following information is, however, particularly advantageous for the user of mobile telephone B or of download client B.

The gift sender address,
The send date and time of the gift offer,
The date and time up to which the transfer request message, or the offer contained therein, is to be valid,
Information such as object name, type, size and, if appropriate, the price of the user data object to be received as a gift,
User rights (number of uses, period of use for the user of the object, etc.) linked to the user data object,
An optional message from the user of mobile telephone A to the user of mobile telephone B, whereby the message also may contain multimedia elements.

8.) The download server D confirms the delivery of the transfer offer message, including the description information for the user data object to be gifted, to the download client A in a status message. The status message is optional and can be requested by download client A in the transfer request message or the gift request according to point 3.).

9.) The transfer offer message is prepared for display by mobile telephone B on a user interface of the user of mobile telephone B, whereupon the user of mobile telephone B confirms the selection of the user data object to be transferred to him/her and thus can instigate the downloading from download server D. Download client B then requests the user data object from download server D.

10.) The selected user data object is now transferred from download server D to download client B and installed on mobile telephone B (i.e., it is suitably dealt with or processed according to the type/format). If what is being downloaded as a user data object to be received as a gift is a chargeable user data object with restrictions with regards to use, such as a limited number of uses of the object or a limited duration of use, a user data object of this kind must be specially dealt with by the download client B or a special application for the management of such user data objects. If the user data object with restrictions or certain user rights is received, the download client B, or the special application for management, evaluates the rights description of the user rights and stores them in a protected area of the memory, not accessible to the user of mobile telephone B, on mobile telephone B and, when requested by the user of mobile telephone B, grants same the use of the user data object according to the rights description. The user data object itself is protected from unauthorized access either in that it is stored encrypted in a freely accessible area of the memory on mobile telephone B or that it is managed by a special application that does not permit any unauthorized access to the user object by the user.

11.) Download client B then sends a status message to download server D that signals a successful downloading or a successful installation of the user data object (such as storage of a video or audio file, or the installation of a program).

12.) Download server D bills the user of mobile telephone A with the price associated with the delivered user data object. This can take place in that download server D instructs a billing system of the mobile radio network in which mobile telephone A is located, to bill the user of mobile telephone A for the gifted user data object; for example, with the normal connection invoice.

13.) As an option, download server D informs download client A of the successful delivery of the gifted user data object to download client B and of the completed billing. This can contain the actual price charged, that based on the properties of mobile telephone B that are taken into account can differ from the original price given in the description information or object description supplied in step 2.).

In the following, the signaling from download server D to download client A in the description information or object description received in step 1.) is again considered, where a described user data object also can be gifted. Signaling of this kind can take place in two ways:

A) The description information contains a simple signaling, such as in the form of an additional message field, that the described user data object can be gifted. Because no special address is linked to this, a gift request or transfer request message must be sent to the same address as a download request for downloading a user data object; i.e., back to download server D.

B) The description information contains an additional specially designated address to which a transfer request message or gift request can be sent. The functionality linked to the address is described by the designation. Download client A can gift the designated object by sending a transfer request message to the specially designated address. The specially designated address can, in this case, be the address of another download server that is also installed on the same data providing component as download server D. However, specially designated address also can be that of a download server or a corresponding application that is executed on a different data providing component.

The signaling from download client A to download server D regarding what user data object can be gifted can take place in two ways corresponding to the above types:

a. With the variant A) shown above, the download client A sends the transfer request message to the given identification (address) that is also specified for downloading the user data object to the own telecommunication device or own mobile telephone. This is the variant that is shown in the concrete exemplary embodiment (see FIG. 2) shown below. To do this, the support of the "gift object" option is signaled by a marking in the description information received by download client A in step 1.). With this option, the object to be gifted is designated by the identification (address) itself.

b. For additional functionality, according to the above variant B) an additional address to which a transfer request message can be sent is transmitted to download client A with the description information. Either the user data object to be gifted is itself designated by the address or it must be marked in the transfer request message by a special information field (with its identification).

With the described method and the messages newly introduced into the procedure for a chargeable delivery of any user data objects to download clients on mobile radio devices, such as mobile telephones, it is possible for the first time to manage, pursuant to the described method, the gifting of a user data object from a download client A to another download client B, whereby advantageously:

the gifting download client A does not itself have to download the user data object to be gifted, download server D signals to download client A in description information (see step 2.) whether the described user data object can be gifted, the gifting download client A signals to download server D its intentions through a new message type; or notification type, i.e., via the transfer request message or gift request explained above, download server D can optionally determine the capabilities or setting of the receiving download client B and/or of the mobile radio device or mobile telephone assigned to same, download server D sends download client B a transfer offer message, including description information, whereby this description information refers to a user data object that is matched to the previously determined properties or capabilities of download client B and/or of the mobile telephone assigned to same, and the description information can, in addition to the usual information, contain information specific to the application shown, download client B can accept the offer extended in the transfer offer message and, thus, the further transactions, such as downloading or transferring the offered user data object to download client B from download server D, etc., can be performed, whereby then, after successful transfer, status information regarding the successful delivery or of billing of the price of the delivered user data object can be transmitted to download client A.

Several variants can be used as the form of coding for a transfer request message or gift request:

A binary coding that uses defined binary codes and, therefore, enables a compact representation of the data, A textual, XML based representation whereby the data to be transferred is structured by tags, with the message in text form being relatively clear and machine readable, but also having an increased amount of data, A binary XML based representation that uses binary values as tags for structuring, thus enabling a more compact representation than the textual XML based representation, but can be read directly and interpreted by people, or a textual representation via header fields consisting of names and associated values. It should be noted that a representation of this kind is, for example, also used for Internet e-mails.

Figure 2:
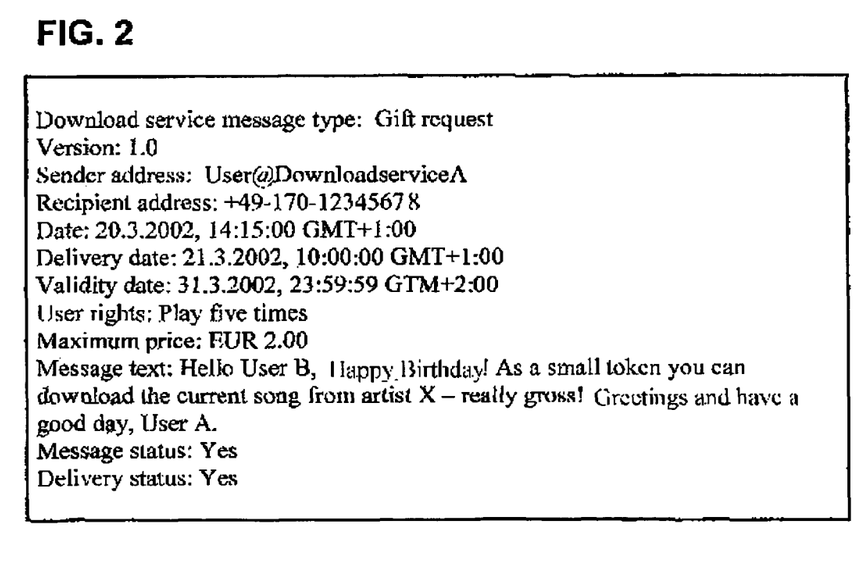
FIG. 2 shows an example of a transfer request message.

Reference is now made to FIG. 2 in which examples of transfer request messages or gift requests are shown.

In this example, it is assumed that a purpose of the transfer request message is for a user of a download client A (user A) to communicate a message to a user of a download client B (user B) and at the same time offer for downloading a song by an artist X, for which user B receives the right to play five times. First, the message type is given in the transfer request message and enables the download service defined by the download client and download server to determine the type of message (in this case, a transfer request message or gift request). A version number of the used download client is then given for creating or sending the transfer request message. This is followed by the sender address of the gifting user. The address of the recipient is given in the example in the form of a telephone number (MSISDN). In this way, the download server can deliver the gift offer or the transfer offer message to user B, such as by WAP-Push, if the terminal of user B supports this feature. Otherwise, a message using the SMS (Short Message Service), MMS (Multimedia Message Service) or e-mail can be used. Furthermore, the time and date of sending, the requested deliverer and the validity of the offer are given. Thus, for example, a time for delivery that coincides with the birthday of the recipient (user B) can be chosen that is very suitable for the recipient. A setting of this kind, moreover, does not require the sender to send the transfer request message at exactly this point in time. This is, therefore, more convenient for the sender.

Furthermore, the sender has also inserted a comment in the form of a text with birthday wishes. This is followed by two fields that show a status message (message status) is being sent by the download server to the sender (user A) when the transfer offer message has been delivered to user B, and furthermore after the user data object to be gifted, in this case the song of artist X, has been successfully delivered, a status message regarding this is to be sent to the sender (delivery status).

Although the present invention has been described with reference to specific embodiments, those of skill in the art will recognize that changes may be made thereto without departing from the spirit and scope of the present invention as set forth in the hereafter appended claims.

The invention claimed is:

1. A method for gifting user data objects, the method comprising:
sending a transfer request message from a first telecommunication device to a data providing server the transfer request message instructing the data providing server to offer to a second telecommunication device at least one user data object that is associated with user rights;
sending a transfer offer message from the data providing server to the second telecommunication device, wherein the transfer offer message comprises description information of the at least one offered user data object;
accepting by the second telecommunication device at least one of the at least one offered user data objects; and
transferring the at least one accepted user data object together with a corresponding user rights description from the data providing server to the second telecommunication device; and
charging a user of the first telecommunication device for the at least one user data object accepted by and transferred to the second telecommunication device.

2. A method for gifting user data objects as claimed in claim 1, further comprising determining, via the data providing server, processing information which indicates a type of user data objects that the second mobile telecommunication device is setup to process.

3. A method for gifting user data objects as claimed in claim 2, wherein the data providing server obtains the processing information from one of the second mobile telecommunication device, the first mobile telecommunication device and a component assigned to the second mobile telecommunication device in a telecommunication network assigned to the second mobile telecommunication device.

4. A method for gifting user data objects as claimed in claim 1, wherein the transfer offer message contains at least one of information on a transfer offer sender address, information on a send date-send-time of the transfer request message, information on a duration of validity of the transfer contained in the transfer offer message, information on user rights linked to the group of user data objects to be transferred to the second mobile telecommunication device, and a comment for the user of the second mobile telecommunication device.

5. A method for gifting user data objects as claimed in claim 1, wherein the transfer offer message is transmitted to the second mobile telecommunication device as part of one of an SMS message, an MMS message, an e-mail and a WAP-Push message.

6. A method for gifting user data objects as claimed in claim 1, wherein at least one of the first and the second mobile telecommunication device is in a mobile radio network.

7. A method for gifting user data objects as claimed in claim 1, wherein the data providing server is part of a mobile radio network.

8. A method for gifting user data objects as claimed in claim 1, wherein the user data objects contain at least one of text information, audio information, video information, executable programs, and software modules.

9. A method for gifting user data objects as claimed in claim 1, wherein the transfer of data from and to at least one of the first and the second mobile telecommunication devices occurs via Internet protocols.

10. A method for gifting user data objects as claimed in claim 9, wherein the Internet protocol is a Hypertext Transfer Protocol.

11. A method for gifting user data objects as claimed in claim 1, wherein at least one of the first and the second mobile telecommunication device includes a radio module.

12. A method for gifting user data objects as claimed in claim 11, wherein at least one of the first and the second mobile telecommunication device is one of a mobile telephone, a cordless telephone and a portable computer.

13. A method for gifting user data objects as claimed in claim 11, wherein the transfer of the data from and to at least one of the first and the second mobile telecommunication devices occurs via WAP protocols.

14. A method for gifting user data objects as claimed in claim 1, further comprising:
prior to sending the transfer request message, requesting description information of at least one user data object provided by the data providing server; and
based on the requested description information, selecting the at least one user data object to be offered to the second telecommunication device.

15. A method for gifting user data objects as claimed in claim 14, further comprising:

selecting with the help of the description information at the second telecommunication device the at least one offered user data object that is to be accented to be transferred.

16. A method for gifting user data objects as claimed in claim 14, wherein the requested description information comprises information whether one or more user data objects can be offered.

17. A method for gifting user data objects as claimed in claim 16, further comprising:
   selecting with the help of the description information at the second telecommunication device the at least one offered user data object that is to be accepted to be transferred.

18. A data providing server for use in a system for gifting user data objects in a telecommunication network, the data providing server including instructions embodied in non-transitory computer-readable media and executable by one or more processors for:

receiving a transfer request message from a first telecommunication device, the transfer request message instructing the data providing server to offer to a second telecommunication device at least one user data object that is associated with user rights;

sending a transfer offer message from the data providing server to the second telecommunication device, wherein the transfer offer message comprises description information of the at least one user data object;

receiving from the second telecommunication device an acceptance of at least one of the at least one user data object; and transferring the at least one accepted user data object together with a corresponding user rights description from the data providing server to the second telecommunication device; and charging a user of the first telecommunication device for the at least one user data object accepted confirmed by and transferred to the second telecommunication device.

* * * * *